Patented Feb. 9, 1937

2,069,801

UNITED STATES PATENT OFFICE 2,069,801

CELLULOSIC STRUCTURES

Winfield Walter Heckert, Ardentown, Del., assignor, by mesne assignments, to E. I. du Pont de Nemours & Company, Wilmington, Del., a corporation of Delaware No Drawing. Application May 27, 1933, Serial No. 673,315

8 Claims. (Cl. 106—40)

This invention relates to cellulosic structures, such as filaments, threads, fabrics, sheets, films, caps, tubing or the like. More particularly, this invention relates to cellulosic structures of the type just mentioned having a subdued or low luster and/or that are more or less opaque.

In the ordinary methods of preparing cellulosic structures, such as filaments, threads, films, caps, tubing, etc., from viscose, cuprammonium, nitrocellulose, cellulose acetate and other cellulosic solutions (without the addition of opaquing and/or low luster-inducing agents to the solutions), the products are transparent or translucent and/or very highly lustrous. For many purposes, transparency, brilliant sheen and luster are not desirable and thus restrict the uses of the materials. Recently, various methods have been proposed for producing cellulosic structures having a low or subdued luster and/or opacity.

I have found that I can produce cellulosic structures characterized by a low luster and/or opacity by incorporating therein an organic compound containing one or more ether groupings and preferably three or more carbocyclic or heterocyclic nuclei highly deficient in hydrogen, their —S—, —Se—, —Te— and —NH— analogs, or their colorless substitution products. In so far as the instant invention is concerned, each closed chain of carbon or hetero or combination of carbon and hetero atoms will be considered a nucleus. Thus, benzene, naphthalene and carbazol have one, two and three nuclei respectively.

The objects of the instant invention will become apparent from the following description and appended claims.

In accordance with the principles of the instant invention, there are provided cellulosic structures having subdued or low lusters and/or being more or less opaque. These desiderata are secured, according to one phase of the invention, by incorporating in the solution from which the structure is to be produced an opaquing and/or a low luster-inducing agent of the type hereinafter more fully explained.

The low luster-inducing agent contemplated by this invention is an organic compound or resin containing one or more ether groups and preferably also three or more carbocyclic or heterocyclic nuclei highly deficient in hydrogen, their —S—, —Se—, —Te— and —NH— analogs, and their colorless substitution products and substitution products such as, for instance, those in which hydrogen is replaced with halogen, an alkyl group, an alkoxyl group, a hydroxyalkyl group, or a carbocyclic or heterocyclic nucleus highly deficient in hydrogen. So far as the instant invention is concerned, each closed chain of carbon or hetero atoms or combination of carbon and hetero atoms will be considered a nucleus. Thus, benzene, naphthalene and carbazol have one, two and three nuclei respectively. More specifically, the low luster-inducing agent may be defined as an ether containing preferably three or more carbocyclic or heterocyclic nuclei highly deficient in hydrogen of the class which comprises simple ethers containing one ether group, ethers of polyhydric phenols, ethers of polyhydric aralkyl alcohols or phenol alcohols, their —S—, —Se—, —Te— and —NH— analogs, and substitution products thereof and ether resins, such as may be prepared from polyhydroxylated carbocyclic and heterocyclic substances and aralkyl polyhalides disclosed in the copending application of James A. Arvin, Serial No. 651,634, filed January 13, 1933.

These opaquing and low luster-inducing agents, which are white in color, possess a sufficiently low vapor pressure and are sufficiently inert to resist change or removal from the cellulosic structure in the ordinary process of making and finishing the same during the manufacture thereof. They also effectively resist removal or change during any of the usual processes to which the finished cellulosic structure may be subjected, such as boiling-off, dyeing, bleaching, washing, ironing, etc. These substances are incompatible with the mass of the substance constituting the final product. They may be soluble but, in the preferred embodiment of this invention, they are insoluble in the solution from which the structure is prepared.

Organic compounds containing one or possibly two carbocyclic or heterocyclic nuclei have a delustering effect but this is of minor degree in comparison with certain white inorganic pigments which are now being used to produce the high degree of delustering in demand. I have discovered that incorporation of as many as three nuclei in a single molecule increases the delustering and opacifying power many times, and that compounds having four or more nuclei are particularly effective. I prefer, therefore, to have four or more nuclei present, since such compounds can develop a degree of delustering which cannot be obtained with those containing one or two nuclei. The latter must be used in much larger quantities in order to even approach the delustering produced by compounds containing three or more nuclei. Moreover, the necessary large quantities of single or double nuclei compounds seriously affect the spinning and physical properties of the cellulosic structures, the result being inadequate delustering coupled with unsatisfactory quality. It is a particular point of my invention that it permits duplicating the high degree of delustering obtainable with certain white inorganic pigments in a cellulosic structure practical in other respects.

Highly effective delusterants function in particular by reason of their opacifying power which is a function of the difference in refractive index between the delusterant particle and the surrounding medium. Those in my preferred range differ from the index of the medium by at least .10 and the greater this difference, the more effective the compound as an opacifier and/or delusterant. Most organic compounds have several indexes and the statement just made refers to the highest index of the compound or to any one of the several indexes.

As illustrative examples of simple ethers contemplated by the instant invention may be mentioned di-b-naphthyl ether and derivatives, symmetrical 5-chloro-di-b-naphthyl ether, symmetrical 5-methoxydi-b-naphthyl ether, dibenzyl ether of symmetrical 5-hydroxydi-b-naphthyl ether, a-naphthylmethyl-b-naphthyl ether, b-naphthyl thienyl ether, di-b-naphthyl sulfide and di-biphenyl ether.

As illustrative examples of ethers of polyhydric phenols contemplated by the instant invention may be mentioned dibenzyl hydroquinone ether, dianisyl ether of hydroquinone, symmetrical di-a-naphthylmethyl ether of resorcinol, di-thienyl ether of p-p'-dihydroxy diphenyl, dibenzyl ether of 4,4'-di-hydroxyxanthone, 6-methyl-2-b-naphthyl ether of 2,6-dihydroxynaphthalene, di-b-naphthyl thioether of hydroquinone, dimethyl ether of di-naphthylol methane, diethyl ether of b-di-naphthol, dibenzyl ether of p-p'-dihydroxy diphenyl sulfone, di-b-naphthyl-p-phenylenediamine.

As illustrative examples of ethers of aralkyl alcohols and phenol alcohols may be mentioned di-b-naphthyl ether of naphtho-1,4-xylylene alcohol, b-naphthyl ether of naphtho-1,4-xylylene alcohol, diphenyl ether of 1,2-xylylene alcohol, diethienyl ether of 1,2-xylylene alcohol, triphenyl ether of mesicerin, di-naphtho-a-benzyl ether of o-oxy-phenyl ethyl alcohol, b-naphthoxy ether of naphtho-1,4-xylylene alcohol, di-b-naphthyl ether of phenylethane-1,2-diol.

As an illustrative example of an ether resin may be mentioned the resin prepared from 2,6-dihydroxynaphthalene and 1,4-xylylyl-di-bromide.

The refractive indexes of a few of the foregoing specific compounds are as follows:

Di-b-naphthyl ether (at least two principal indexes, approximately 1.58 and 1.71).

Dibenzyl hydroquinone ether (at least two principal indexes, approximately 1.59 and 1.63).

Dimethyl ether of di-naphthylol methane (at least two principal indexes, approximately 1.68 and 1.78).

Di-a-naphthylmethyl ether (at least two principal indexes, approximately 1.62 and 1.69).

The quantity of the low luster-inducing and/or opaquing agents which may be used may vary within wide limits, depending principally upon the opaquing and luster desired in the final product. Cellulosic structures containing these low luster-inducing and/or opaquing agents in amounts ranging from 0.10% to 20% by weight have given satisfactory results, but, of course, it is obvious that smaller or larger quantities may be employed as desired. When a viscose solution is employed, satisfactory results may be secured if it contains 7% cellulose and from 0.01% to 1.5% more or less of the low luster-inducing and/or opaquing agent.

If desired, the low luster-inducing agents contemplated by the instant invention may be used in combination with each other and/or with other low luster-inducing agents, such as mineral oil, petroleum jelly, waxes, paraffin, benzene, toluene, pine oil or inorganic pigments, such as titanium dioxide, lithopone, zinc sulfide, etc.

The low luster-inducing agent may be added to the solution at any stage in the course of the manufacture thereof or after the preparation of the solution and prior to the spinning, extrusion or casting operation. It may be added directly, if the particle size is satisfactory, or after suitable adjustment of the particle size by any of the well-known methods, such as emulsification, grinding in a colloid mill or pebble mill, or in the form of a suspension or emulsion prepared with or without the assistance of suitable dispersing agents or protective colloids, such as soaps, sulphonated oils, alkyl naphthalene sulphonates, sodium caseinate, etc. or combinations thereof.

In order to more fully explain the principles of this invention, the following illustrative examples are given. It is to be understood that these examples do not in any way restrict the invention thereto but merely illustrate several specific and preferred embodiments which have given satisfactory results.

*Example I.*—20 pounds of dibenyl hydroquinone ether are ground in a colloid mill with 40 pounds of water and 0.4 pound of sodium caseinate until most of the particles are below 1 micron in diameter. A sufficient quantity of the suspension, prepared as just described, is added and incorporated in the viscose to produce a final viscose solution containing 0.5% dibenyl hydroquinone ether, 7% cellulose and 6% NaOH. The resultant viscose is processed in the usual manner and finally cast or spun.

*Example II.*—An emulsion of di-b-naphthyl ether (melting point 102° C.) is prepared by emulsifying a benzene or similar solution in the presence of a suitable protective colloid. A sufficient quantity of the emulsion is added to yield a solution containing 1.0% di-b-naphthyl ether, 7% cellulose and 6% NaOH. A sufficient quantity of the resulting emulsion is added to and incorporated in viscose to yield a solution containing 0.5% di-b-naphthyl ether, 7% cellulose and 6% NaOH. The resulting solution is processed and extruded in the usual manner.

*Example III.*—A sample of di-b-naphthyl sulfide is ground in a pebble mill with 5% sodium caseinate and 2 parts of water. When most of the particles have been reduced to a particle size of about 1 micron in diameter, the suspension is added to and incorporated in viscose in such amount as to yield a viscose solution of 0.5% di-b-naphthyl sulfide, 7% cellulose and 6% NaOH. The viscose solution is then processed and extruded in the usual manner.

*Example IV.*—An ether type resin, such as may be prepared from diphenylol-propane and 1,4-xylylyl dibromide in the manner disclosed in copending application of James A. Arvin, Serial No. 651,634, filed January 13, 1933, is ground in a pebble mill with 2% sodium caseinate and 2 parts of water until practically all of the particles are less than 2 microns in diameter and all below 4-5 microns in diameter. The resulting suspension is added to and incorporated in the caustic solution used to dissolve the xanthate. After adding the suspension, the xanthate is added as usual. Enough suspension is used to produce a final viscose solution containing 1% resin, 7% cellulose and 6% NaOH. The viscose solution is processed and spun in the usual way.

Though the preferred embodiments of this invention contemplate the incorporation of the low luster-inducing agent in the solution at some time prior to the extrusion or casting thereof, satisfactory results may be secured also by applying the low luster-inducing agent to a previously formed cellulosic structure. In other words, the low luster-inducing agent may be incorporated in the final cellulosic structure by an after treatment.

Though the invention has been specifically described in connection with the viscose process, it is obvious that the principles thereof are equally applicable to the cuprammonium, cellulose nitrate and cellulose acetate processes.

Since the products obtained by the various processes just mentioned are formed of substances derived from cellulose, said products are defined as being formed of a cellulose derivative.

In the case of cellulosic solutions employing organic solvents, it is only necessary that a suitable choice of ether be made so that its solubility characteristics do not interfere. It has already been pointed out that the low luster-inducing substance must be incompatible with the mass of substance constituting the final product. In addition, in the case of cellulose acetate or nitrate spinning solutions, it is preferable that the low luster-inducing substance be insoluble in the solvent employed. However, resinous materials and certain crystalline substances soluble in the solvent precipitate (on the evaporation of the solvent) in the cellulose acetate in the form of fine amorphous or crystalline particles sufficiently small and well distributed to avoid harmful effect on the physical properties of the resulting structure. The advantage in such cases lies in avoiding the necessity for emulsifying or grinding the compounds to obtain suitable sub-divisions. Suitable compounds may be readily selected from any specific system by one skilled in the art.

The following example illustrates one embodiment of the invention wherein organic solvents are utilized to dissolve the cellulosic material:

*Example.*—3 pounds of dry crystalline di-b-naphthyl ether are dissolved in 100 pounds of cellulose acetate solution containing approximately 15% cellulose acetate in a suitable solvent such as acetone or acetone and alcohol. The resulting clear solution is spun under the customary conditions for dry spinning cellulose acetate thread. The resulting yarn containing about 20% of ether by weight has only a faint sheen, the luster having been reduced remarkably in comparison with that of yarn spun under the same conditions but containing no foreign materials.

Since it is obvious that various changes and modifications may be made in the above description without departing from the nature or spirit thereof, this invention is not restricted thereto except as set forth in the appended claims.

I claim:

1. An artificial cellulosic structure comprising a transparent cellulose derivative containing di-b-naphthyl ether in an amount to impart opacity and/or low luster to the product.

2. An artificial cellulosic structure comprising a transparent cellulose derivative containing di-benzyl hydroquinone ether in an amount to impart opacity and/or low luster to the product.

3. An artificial cellulosic structure comprising a transparent cellulose derivative containing di-methyl ether of di-naphthylol methane in an amount to impart opacity and/or low luster to the product.

4. Artificial silk filaments formed of regenerated cellulose and containing di-b-naphthyl ether in an amount to impart opacity and/or low luster to the product.

5. Artificial silk filaments formed of regenerated cellulose and containing di-benzyl hydroquinone ether in an amount to impart opacity and/or low luster to the product.

6. Artificial silk filaments formed of regenerated cellulose and containing di-methyl ether of di-naphthylol methane in an amount to impart opacity and/or low luster to the product.

7. An artificial cellulosic structure comprising a transparent cellulose derivative having opacity and/or low luster imparted thereto by the incorporation therein of an incompatible organic compound of the class which consists of ethers containing one or more ether groups and also at least three carbocyclic or heterocyclic nuclei highly deficient in hydrogen, the —S—, —Se—, —Te— and —NH— analogs thereof and colorless substitution products of said ethers and analogs in which the substituent group or groups replace hydrogen.

8. Artificial silk filaments formed of regenerated cellulose having opacity and/or low luster imparted thereto by the incorporation therein of an incompatible organic compound of the class which consists of ethers containing one or more ether groups and also at least three carbocyclic or heterocyclic nuclei highly deficient in hydrogen, the —S—, —Se—, —Te— and —NH— analogs thereof and colorless substitution products of said ethers and analogs in which the substituent group or groups replace hydrogen.

WINFIELD WALTER HECKERT.